Feb. 24, 1970   J. NADOR ET AL   3,497,806
MINIATURIZED HIGH TORQUE, SINGLE AIR GAP METER MECHANISM
Filed Nov. 4, 1964   4 Sheets-Sheet 1

INVENTOR
Julius Nador
Harry Magyary
Leon E. Thomas Jr.
BY Peck + Peck
ATTORNEYS

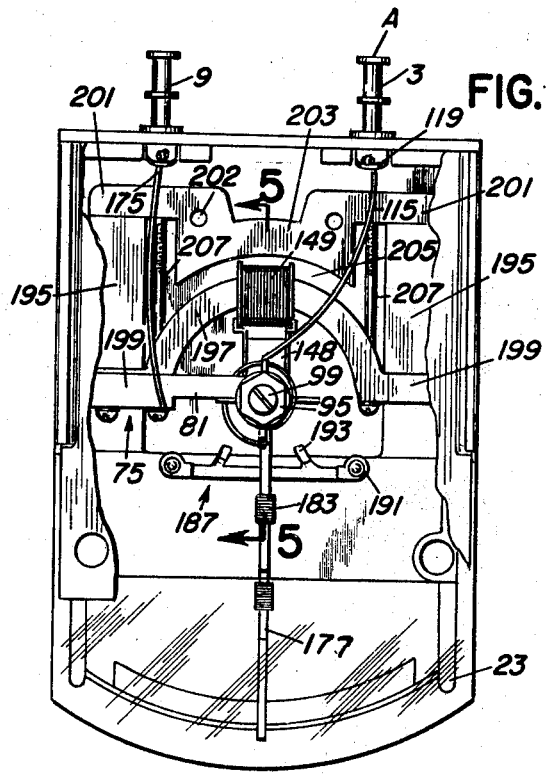
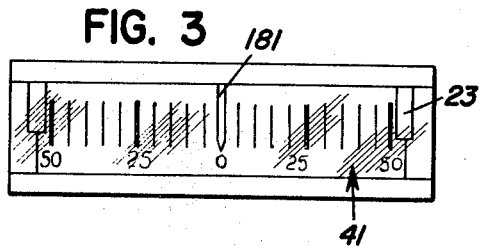
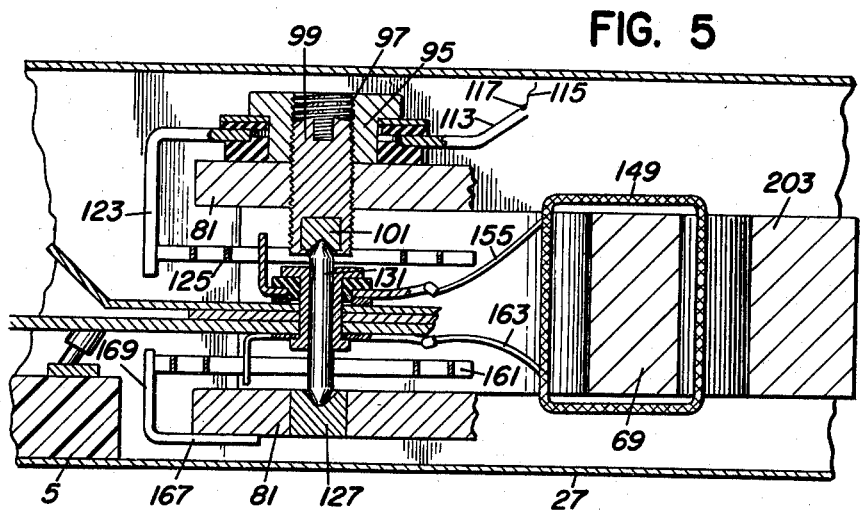

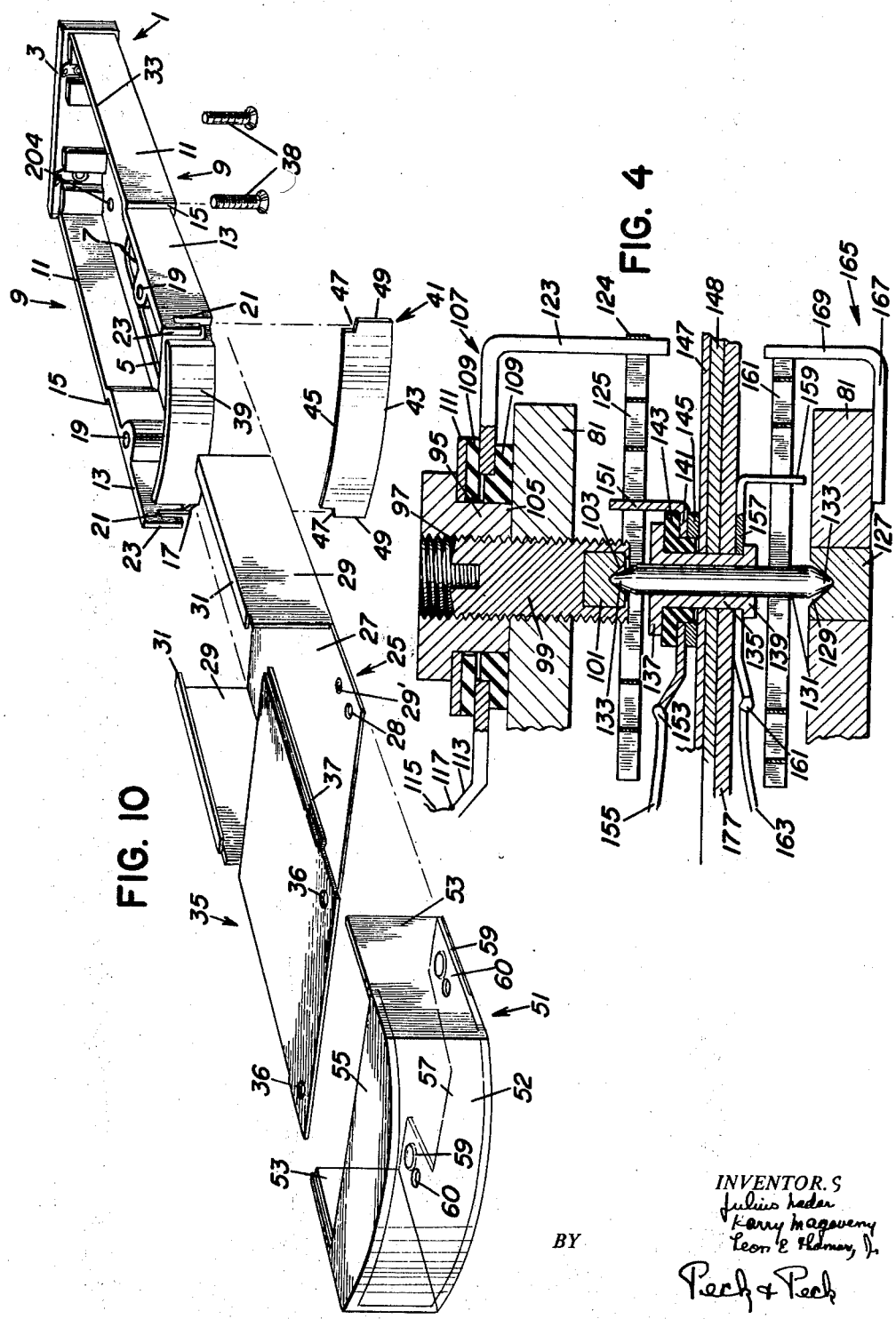

United States Patent Office 3,497,806
Patented Feb. 24, 1970

3,497,806
MINIATURIZED HIGH TORQUE, SINGLE AIR
GAP METER MECHANISM
Julius Nador, Orange, Harry Magoveny, New Haven, and
Leon E. Thomas, Jr., Fairfield, Conn., assignors, by
mesne assignments, to Sigma Instruments, Inc., a corporation of Massachusetts
Filed Nov. 2, 1964, Ser. No. 408,161
Int. Cl. G01r 1/20, 5/20, 1/04
U.S. Cl. 324—150                       9 Claims

ABSTRACT OF THE DISCLOSURE

Miniaturized high torque, single air gap meter mechanism enclosed within a case for panel mounting. A magnetic system, a flux return path in supporting engagement with the poles of the magnetic system, the bridge, movement and return path assembled as a separate unit. A scale removable without opening the case.

---

This invention relates broadly to the art of electrical meter units and in its more specific aspects it relates to such meter units of the high torque mechanism type providing substantial miniaturization and dimensional reductions; and the nature and objects of the invention will be readily recognized and understood by those skilled in the arts to which it relates in the light of the following explanation and detailed description of the accompanying drawings illustrating what we at present believe to believe to be preferred embodiments or mechanical expressions of our invention from among various other forms, arrangements, combinations and constructions, of which the invention is capable within the spirit and scope thereof.

There are many applications of electrical meters which demand that the meter be of very small or so-called "miniature" size while still capable of developing high torque with low power requirements. It is also highly desirable that such instruments have a high torque to weight ratio, that is, that the torque developed by the mechanism should be high with the weight of the complete moving component of the mechanism low. Thus, it follows that in electrical measuring instruments or meters having the factors of high torque and lower power requirements with low weight of the complete moving component, the ratio of torque to weight of the moving component should always be as high as possible for a given size of instrument.

In devising the meter or instrument of this invention we have kept the aforementioned requirements or desirabilities in mind while following current demands in the field in which we are particularly interested. In the electrical field, and particularly in connection with electronic equipment, there is a continuing demand and requirement for further miniaturization, and in conformity with such demands and requirements we have developed a high torque meter mechanism of miniature or small size type which is adapted to be mounted on a panel, and we have dimensionally reduced the unit, or substantially further miniaturized it, to provide significant reduction of the space necessary for the meter behind the panel in which it is mounted. We have provided such a high torque mechanism having this miniaturization characteristic which is so highly advantageous in connection with current electronic equipment, and have so designed this mechanism and its housing that its depth or length is not only substantially reduced but its thickness is also substantially reduced so that the resulting meter unit is of a flat or "pan cake" type.

The meter mechanism which we have devised is so designed that the overall thickness of the movement is reduced so that it is on the order of ½ inch, including the case which, as all skilled in this art will recognize, constitutes a substantial reduction in the thickness dimension. In achieving this purpose the meter movement has been reduced accordingly, without affecting its efficiency, so that there is sufficient clearance inside of the case to allow for free movement of all of the operating parts of the meter. In many meters of small or miniature type it is necessary to form the meter with a barrel which protrudes below the case, in our new and ingenious design we have completely eliminated this protruding barrel so that the reduced dimension mentioned above exists throughout the meter body.

It will be appreciated that this aforementioned reduction in the overall thickness of the instrument to approximately ½ inch will be exceedingly useful and desirable in the face mounting of an instrument on the front of the instrument panel without taking any space behind the panel.

In the production of conventional type meters a substantial amount of trouble has been encountered due to the misalignment of pivots in the pivot and coil assembly, such trouble concerns linearity of the movement, repeatability, friction and the like. We have developed a pivot and coil assembly which overcomes the former problems of misalignment, for we have devised and used in our improved meter a single double end pivot, providing an integrated unit rather than the conventional double pivot unit.

Our newly devised high torque meter mechanism comprises a basic magnetic circuit of the single air gap type which is basically more efficient than the conventional double air gap type.

It has been one of our prime purposes in the design of this instrument to provide an arrangement for facilitating the assembly of the instrument and also the manufacture thereof. In accomplishing such purposes we have constructed the meter so that the bridge and movement and return path is assembled as a separate unit, and by simple connecting means this assembly may be attached to the magnetic system to thereby complete the assembly of the movement.

The design embodied in the meter of this invention provides for substantially more uniform distribution of flux which gives better linearity because of the use of relatively large volume pole pieces in the magnetic circuit of this invention. It is also possible because of the construction and arrangement of this high torque mechanism that for a given sensitivity the winding resistance can be reduced and a very satisfactory torque to weight ratio maintained compared to conventional type meters. This is possible due to the small size of the coil which is used in the present meter.

Our type of meter is such that its thickness dimension may be only 1 inch and the pointer of the instrument may be brought out or extended in the opposite direction from conventional meters so that it may be applied to the front of the panel without extending at all beyond the back of the panel.

A further advantage of the type of meter which we have developed wherein a one-piece base and scale support plate is used, resides in the fact that it is possible with our meter to provide a means for changing the scale without opening the case of the instrument.

We have developed a novel case or housing for the instrument which facilitates assembly and dis-assembly thereof providing for ready access to the instrument itself.

The housing for the instrument is so designed at its forward end that a specially designed flexible scale is easily attachable thereto and detachable therefrom.

With the foregoing general objects, features and results in view, as well as certain others which will be apparent from the following explanation, the invention consists in certain novel features in design, construction, mounting and combination of elements, as will be more fully and particularly referred to and specified hereinafter.

Referring to the accompanying drawings:

FIG. 1. is a top plan view of one form of our meter with parts of the casing thereof broken away.

FIG. 2 is a top plan view of a further form of our meter with parts of the casing thereof broken away.

FIG. 3 is a front view in elevation of the meter of FIG. 2 illustrating expecially the scale and the mounting thereof on the housing.

FIG. 4 is an enlarged detail view in section illustrating the mounting and pivoting means for the moving assembly of the instrument.

FIG. 5 is a view taken on the line 5—5 of FIG. 2.

FIG. 10 is an exploded view illustrating the housing, the scale and the mounting means therefor.

Figure 1:
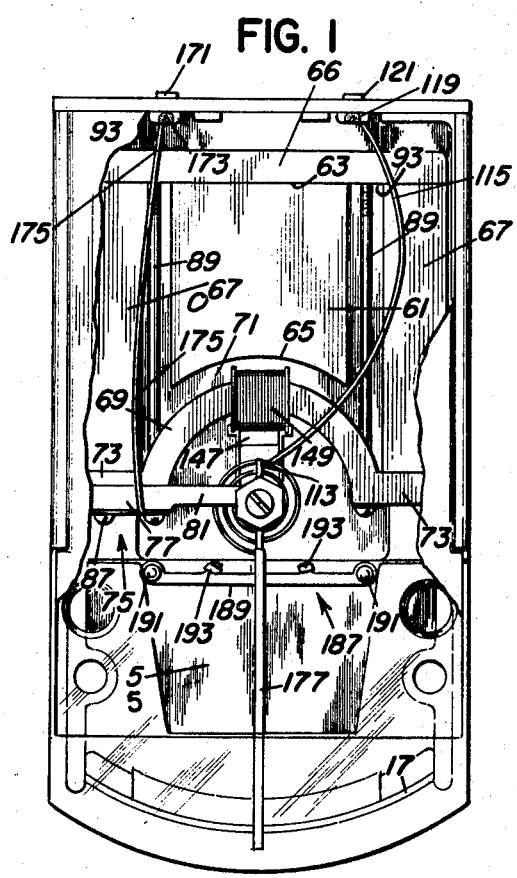

In the accompanying drawings we have disclosed several forms of the miniature meter which we have devised, and particularly in FIG. 10 thereof, we have illustrated one form of housing which we have found to be unusually satisfactory for enclosing and protecting the meter movement and the magnetic system therefor and for facilitating access thereto. We have used the numeral 1 to disclose in its entirety what we shall term the base of our housing. This base may be formed of any suitable plastic or the like material and comprises a transverse end wall 3, a bottom wall 5 having a cutout section 7 therein and longitudinal side walls designated generally by the numeral 9. The side walls, while being integral are preferably formed in two sections, namely the wall sections 11 which extend from each end of the transverse end wall 3 and the wall sections 13 which extend from the ends of and are integrally formed with the wall sections 11, the wall sections 13 being disposed closer to one another than the walls 11 to provide at the juncture of the sections, shoulders 15. The forward end of the bottom wall 5 is of curved or arcuate configuration as illustrated at 17 and the two side wall sections 13 are formed with oppositely disposed semi-circular thickened portions inwardly disposed providing circular apertures 19 therein. The forward end of each side wall 13 is formed with an upwardly extending notch 21 therein forming a downwardly depending hook or nose 23 which, as will be apparent from the drawings, is cut off so that it is spaced upwardly from the bottom 5. The bottom 5, including the cutout opening 7, is closed by what we shall term the case, which is generally designated by the numeral 25 which comprises a plate member 27 having a pair of upwardly extending side walls 29 which are inwardly flanged as at 31. Consideration of the drawings makes it clear that the upstanding side walls 29 are of reduced longitudinal dimension relative to the plate member 27. The plate member 27 at its forward corners is provided with an aperture 28 (one being shown), and with a dimple 29' which extends inwardly of the case, the dimples being spaced from the apertures. The case 25 is assembled with the base 1 by sliding it over the bottom 5 of the base with the side walls 29 sliding over the walls 11 of the base and the flanges 31 extending in sliding contact with the top edges of the walls 11 but in spaced relation thereto.

The housing further includes a cover designated generally by the numeral 35. This cover is of generally rectangular configuration and is provided with the depressed sides or tracks 37 which extend a part of the distance of the edges of the cover and when assembled with the base and the case is slidably mounted on the top of the wall sections 11 with the depressed tracks 37 slidably received between the inturned flanges 31 and the top edges 33 of the walls 11. At each forward corner the cover 35 is provided with an opening 36. The cover when assembled has a relatively tight fit with the rest of the assembly.

When the case 25 is slidably assembled on the base 1, as described, and the cover 35 is assembled in position between the flanges 31 and the top edges 33 of the longitudinal side walls 11, the openings 19, 28, and the openings 36 in the cover are all in alignment so that the instrument may be mounted on a panel by any suitable means extended through these openings. It will be understood that the various members may be dis-assembled so that the housed meter (to be described) may be removed for repair or replacement.

The forward arcuate edge 17 of the bottom plate 5 is provided with an elongated upstanding scale support plate 39 which is shorter in length than the distance between the hooks 23, or downwardly depending noses, and the edges of the scale support plate 39 are positioned slightly rearwardly or toward the rear wall 3 with respect to the hooks 23.

One feature of our invention embodies a scale blank designated in its entirety by the numeral 41, this scale blank is preferably composed of a strip of flexible material which may be a suitable plastic, and of course the scale graduations are marked on the blank. The scale blank 41 is formed with a linear bottom edge 43 and a top linear edge 45 which is of less length than bottom edge 43 to provide corner cutouts 47. The scale blank is assembled in position against and supported on the scale support 39 by flexing said scale blank and positioning it so that the corner cutouts 47 thereof are in the notches 21 and between the end walls 13 and the hook members 23, the cutout portions 47 being so formed that the top edge 45 of the scale blank will extend along and in alignment with the top arcuate edge of the scale support 39.

Our meter housing is completed by an end shield designated generally by the numeral 51 which, when assembled, extends over the end of the housing and protects and makes visible the scale blank 41. This end shield 52 is formed of any suitable transparent plastic or the like material and provides an arcuate transparent or forward face 52 and side walls 53 which are slidably mounted over the forward ends of the side walls 13 of the base. The shield also involves top and bottom walls 55 and 57, respectively, the wall 57 having spaced openings 59 and 60 formed at each corner thereof. The shield is mounted on the instrument so that the corner elements thereof having the openings 59 and 60 therein will slide between base 5 and case plate 27, and the dimples 29' will project into the holes 59 to releasably maintain the shield in operative position on the instrument. The hole 60 in the shield will mate and be aligned with the holes 19, 28 and 36.

It will now be recognized that we have devised a housing for a meter which requires no screws or other extraneous fastening elements to maintain the various members of the housing in proper position. The advantages of such a construction will be apparent for the housing may be assembled and disassembled in a simple manner without the necessity of using screwdrivers and the like tools.

In FIG. 1 of the drawings we have illustrated one type of our improved miniature meter mounted in the housing described above, and this meter comprises a generally rectangular magnet 61 centrally mounted within the base 1 and secured therein in operative position in any suitable manner. The magnet 61 includes a pole 63 and an opposite pole 65 which is of concave or arcuate configuration. The return path for the magnet includes the transverse member 66 and a pair of longitudinal members 67 which are preferably formed integral with the transverse member 66 of the return path and extend forwardly from each edge thereof and are, of course, in spaced relation. We provide a bridge 69 which is configured to conform to the configuration of the concave pole 65 of the magnet and is spaced therefrom to provide the single air gap 71. The bridge piece 69 is formed at each end thereof with a longitudinal member 73 extending from each end thereof, one member 73 being in engagement with the end of one member 67 and the other member 73 being in engagement with the end of the other member 67, so that the members 73 form a part of the return path for the flux of the magnetic system.

Figure 7:
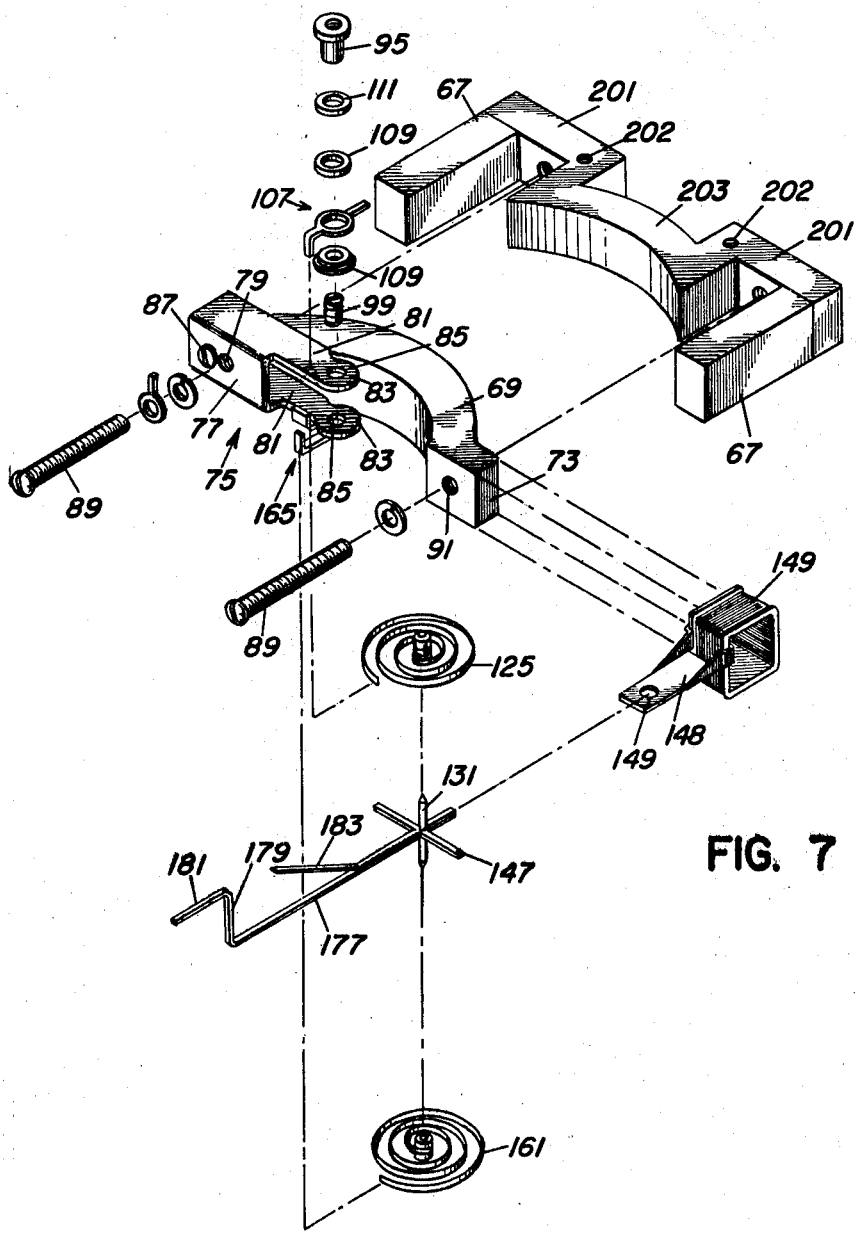
FIG. 7 is an exploded view illustrating the components of the meter of FIG. 2.

We provide a meter movement supporting bracket designated in its entirety by the numeral 75, this supporting bracket being particularly disclosed in FIG. 7 of the drawings, and preferably though not necessarily being of channel shape. The meter movement supporting bracket 75 consists of a base plate 77 having a pair of spaced threaded bores 79 therethrough and a pair of spaced supporting arms 81 extending from one end of the spaced flanges of the base plate 77. The ends of the supporting arms 81 are preferably of annular configuration as at 83 and each such end is bored to provide an aperture 85 therethrough. The meter supporting bracket 75 is assembled in operative position with the base plate 77 thereof attached to one of the members 73 of the bridge 69 by means of a screw 87 which extends through one of the bores 79 and is screwed into an opening provided in the said member 73 of the bridge. The meter supporting bracket 75 is so arranged relative to the bridge and the member 73 that the supporting arms 81 thereof extend to a position substantially centered with respect to the bridge 69 and spaced forwardly therefrom as clearly illustrated in FIGS. 1 and 7 of the drawings.

As illustrated in FIG. 1, the bridge assembly 69 is operatively mounted relative to the return path comprising the members 67 by means of a pair of long screws 89, one of which extends through that member 73 to which the meter movement supporting bracket 75 is attached, and the other of which extends through a bore 91 which is provided in the other member 73 of the bridge. The member 66 of the flux return path is provided with a pair of threaded bores 93 which are in alignment with the bore 91 and one of the bores 79 so that the screws 89 may be inserted through the bores in the bridge assembly and their ends threaded into bores 93 in the member 66 of the flux return path. It will now be apparent that the unitary assembly providing flux return path and providing the members is assembled with the bridge assembly and the meter movement supporting means 75 by the simple operation of properly inserting and threading the screws 89 as described above.

In FIGS. 4 and 5 we have illustrated in detail the meter movement mounting arrangement which comprises one of the significant advantageous features of our invention. In these figures of the drawings the supporting arm 81 which extend from the base plate 77 of the meter movement supporting bracket 75 are broken away but clearly illustrate how these elements support the moving assembly meter movement of the instrument. The upper arm 81 mounts and supports in the opening 85 which is provided therein a bushing 95 which may be internally threaded as at 97 to threadedly receive therein a jewel screw assembly 99 which, in its lower end, fixedly mounts a jewel pivot piece 101 having a bearing depression 103 in the lower end thereof. The head of the bushing 95 is formed with a circumferential recess 105 therein which recess receives a conducting hair spring lug designated generally by a numeral 107. The hair spring lug is positioned between the large diameter head portion of the bushing 95 and the upper arm 81 by means of a pair of insulating washers 109, and a further washer 111, so that the current conducting hair spring lug 107 is electrically insulated from the arm 81 and the bushing 95 by means of the pair of insulating washers 109. The current conducting hair spring lug 107 at one end thereof is upwardly bent as at 113 providing a terminal for the current conducting member and we electrically connect a conducting wire 115 by soldering or the like to the terminal 113 as at 117. The conducting wire 115 extends from the terminal 113 through the housing and is electrically connected to terminal 119 and lead terminal 121 (see FIG. 1) which is on the exterior of the housing. The current conducting lug 107 is provided with a depending leg 123 which is electrically fixed by soldering or the like, as at 124, to a conventional hair spring 125 which is positioned so that the jewel bearing 101 is substantially in the plane of the center of the hair spring.

The lower arm 81 of the two arms of the movement supporting bracket has fixed in the aperture thereof a jewel bearing 127 having a bearing depression 129 in the upper surface thereof, the jewels 101 and 127 are positioned in alignment and pivotally mount the pivot assembly which we shall now describe.

We provide a unitary pivot shaft 131 which comprises a double end single steel pivot of relatively short length which makes possible higher accuracy in the assembly and minimizes positional errors. As we have pointed out the pivot shaft is a solid structure having pointed pivot ends 133 which seat in the jewel bearing cavities 103 and 129. The use of this single integral double end shaft eliminates the misalignment of pivots which occurred in former meters which obviously produces considerable trouble in meters of this character.

It may be aptly pointed out at this point that in prior meters of which we are aware, the pivots for the meter movement were either separate elements, or consisted of a tubular shaft in the ends of which were inserted the pivot points, in the manner of plugs, and in either instance the alignment problem was present. By the development of the solid pivot shaft formed with integral pivot points we have successfully resolved the alignment problems of prior art meter movement mountings.

We provide a bushing 135 which is pressed on the single unitary pivot shaft 131. The bushing is provided with an upper head 137 and a lower reduced diameter head 139. The meter movement assembly includes a further hair spring lug 141 which is mounted between a pair of insulating washers 143 and 145 which are mounted between the head 137 and the cross arm 147 and insulated therefrom. We provide a moving coil 149, operatively supported from shaft 131 by means of support arm 148, and adapted for movement along bridge 69 in a conventional manner. As will be explained in detail hereinafter, the hair spring lug 141 has an upstanding arm 151 which is soldered to and in electrical contact with the hair spring 125 and is connected to such hair spring at a coil thereof inwardly spaced relative to the point of connection of the supporting arm 123 of the hair spring lug 107. The hair spring lug 141 has a terminal arm 153 which extends therefrom and to which a wire 155 is soldered or otherwise connected and the wire 155 (see FIG. 5) is connected to and forms one end of the winding 149. A further hair spring lug 157 is provided in the assembly which seats on the lower head 139 of the bushing 135 and is provided with a downwardly depending arm 159 which is soldered to and in electrical connection with a further hair spring 161. The hair spring lug 157 is provided with a terminal arm 161 which is in electrical connection with a conducting wire 163 which extends to the other end of the winding or coil 149 (see FIG. 5).

We provide a further hair spring lug which we have designated in its entirety by the numeral 165. The base 167 of this hair spring lug 165 is secured to and is in electrical connection with the lower surface of the lower arm 81 of the meter movement supporting bracket 75. Extending upwardly from the base 167 of the hair spring lug 165 is an arm 169 which is fixed to and in electrical connection with hair spring 161.

The housing is provided with a further lead terminal 171 having a terminal 173 (see FIG. 1) within the housing to which is electrically connected a conducting wire 175 which extends through the housing and is electrically connected to the meter movement supporting bracket 75 at its end by the fastening screws 87.

It will now be understood that the terminal contact 119 from the lead terminal 121 is in electrical connection through the conducting wire 115 with the terminal arm 113 of the upper hair spring lug 107 to feed current thereto. The circuit runs through the hair spring lug 107 and its depending arm 123 to the upper hair spring 125. It will further be appreciated that the electrical conducting means or hair spring lug 107 is electrically insulated from all other parts of the movement assembly with the exception of the upper hair spring 125. The circuit proceeds through the hair spring 125 to the upstanding arm 151 of the hair spring lug 141 and from there through the terminal arm 153 and the conducting lead 155 to one end of the winding 149. The hair spring lug 141 by means of the insulated washers 143 and 145 is electrically insulated from the remaining elements of this section of the assembly. The other lead terminal 171 through terminal contact 173 and conducting lead 175 is in electrical connection with the meter supporting bracket 75 so that electrical connection is made through lower arm 81 thereof, with base 167 of hair spring lug 165 and through the upstanding arm 169 thereof is in electrical connection with the lower hair spring 161. The circuit is completed through depending arm 159 of hair spring lug 157 and conducting lead 163 which extends to and is in electrical connection with the other end of the winding 149 to thereby complete the circuit of the instrument. In this connection it should be noted that the upper arm 81 of the meter mounting bracket 75 is insulated by means of insulating washers 109 from the hair spring lug 107.

In the assembly of the meter movement mechanism the bushing 135 is pressed on to the solid unitary double-ended pivot shaft 131 before the lower flange 139 thereof is rolled into final flanged position. Thereafter the elements 143, 141, 145, 147 and 157 are stacked on or about the bushing 135, whereupon the bottom flange 139 is rolled over into the flanged operative position shown in the drawings to maintain these elements in the desired and necessary positions.

The moving assembly including the winding or coil 149 which is supported by the arm 148 which is formed with an opening 149 therethrough which tightly receives shaft 131 and bushing 135, so that when the coil is caused to move along the bridge 69 the assembly will also rotate and pivot. We provide a pointer 177 which may be fixed to the coil supporting arm 148 in any suitable manner so that as the coil which extends around the bridge in conventional manner is caused to move along the bridge the pointer will be deflected in one direction or the other in the usual manner. The pointer 177 at its forward end is formed to provide an upstanding section 179 having an extended visible endpointer 181 which extends over and gives the reading on the scale 41. The pointer assembly may be provided with a counterweight 183 in the usual manner.

Affixed in any suitable manner to the bottom 5 of the base 1 of the housing is a pointed deflection stop which we have designated in its entirety by the numeral 187. This stop device comprises an elongated strip 189 secured at each end thereof to the bottom 5 as at 191. Extending from the elongated strip 189 in spaced relation thereon are a pair of stop lugs 193, these stop lugs may be enacted in any suitable bumper stop material if desired. Consideration of the drawings will clearly indicate that the pointer 177 in zero position will extend between the stop lugs 193 and as the pointer is deflected in one direction or another the stop lugs will limit the degree of deflection since the pointer 177 will come into contact with one or the other of these stop lugs. It will be appreciated that the degree of deflection of the pointer may be varied by changing the distance between the projecting stop lugs 193, thus, if such distance is increased the degree of deflection possible for the pointer will likewise be increased.

In FIG. 2 of the drawings we have illustrated a modified form of our invention comprising a unique and novel design and arrangement of the magnetic system whereby we are enabled in this form of the invention to substantially reduce the required depth of the meter behind the panel in which it is mounted.

In this form of our invention we have used the same reference numerals as hereinabove used to designate similar parts, and it may now be pointed out that the mounting and arrangement of the meter movement assembly in the form of our invention illustrated in FIG. 2 of the drawings is the same as that hereinabove described in FIG. 4 and will not be repeated again. It should also be understood that we preferably use the housing illustrated in FIG. 10 to encase the instrument disclosed in FIG. 2. In this form of our invention our magnetic system consists of a pair of transversely spaced elongated magnets designated by the numeral 195. The bridge 197 is of arcuate or semi-circular configuration and provides a pair of pole pieces 199 which extend from each end of the bridge and when the elements are assembled are in engagement with an end of each magnet 195. The other ends of the magnet are engaged by arms or shoes 201 forming a part of the flux return path and at the interior ends of each such arm we provide as a part of the flux return path a concave element 203 of complementary configuration to the bridge 197 from which the concave surface of the element 203 is spaced to provide the single air gap 205.

In this form of our invention we employ the same type of meter movement supporting bracket 75 having the projected arms 81 which mount the meter movement which has been heretofore described, and we also provide the same type of moving coil 149 which is caused to travel along the bridge 197. We also provide in this form of invention a similar type pointer 177 and counterweight means 183 and also the pointer deflector stop means 187. It should also be understood that the electric circuit of the meter is the same as that disclosed and described in connection with the form of meter illustrated in FIG. 1 of the drawings.

It will now be appreciated that in this form of our invention the bridge, the meter movement assembly and the return path can be assembled as a separate unit and by means of the two screws 207 the aforementioned assembly can be attached to the magnetic system, i.e. the magnets 195 to complete the assembly of the entire meter movement and its actuating means. The advantages of such a construction will be obvious to one skilled in the art.

The return path structure comprising the curved bridge shape major portion 203 and the projecting arms or shoes 201 is fixed in the housing by means of screws 38 which thread into openings 204 in housing bottom 5 and openings 202 in the bridge.

It will be further understand that we provide in this arrangement two separate flux return paths, one being through one magnet 195, the shoe 201 and the element 203 and the bridge, and the other flux return path comprising the other magnet, its shoe 201, the element 203 and the bridge.

Figure 6:
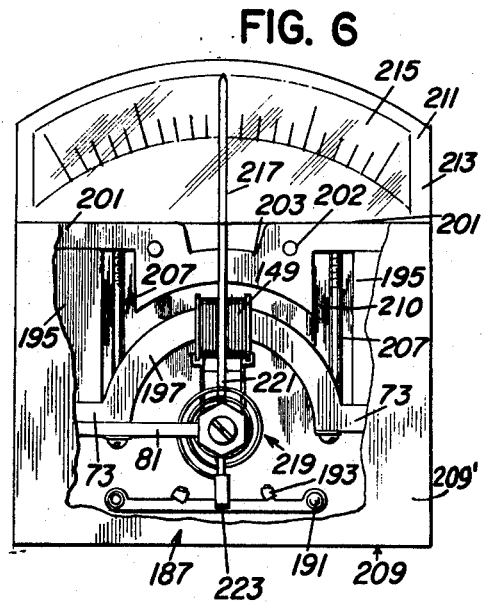
FIG. 6 is a top plan view of a further form of instrument.

In FIG. 6 of the drawings we have disclosed yet a further form of our invention which has certain inherent advantages for certain uses. In this form of our invention we have utilized the same configuration magnetic system as that disclosed in FIG. 2 of the drawings. However, due to the fact that in this meter the pointer is brought out in the opposite direction to that disclosed in FIGS. 1 and 2, we have provided a meter thickness of which is substantially reduced so that the meter can be applied to the front of a panel without extending beyond the back thereof. In the disclosure of FIG. 6 we have used the same reference numerals as heretofore used to describe similar parts. We provide any suitable type of housing designated generally by the numeral 209 to which the elements are attached in the usual manner. The housing 209 is provided with a flat upper wall 209' and a bottom wall 210. At one end the housing is secured as at 211 and we utilize a transparent or the like shell 213 which extends over this end of the housing. A scale 215 is mounted on the housing and under the transparent shell 213. We provide a straight pointer 217 which operatively extends from the meter movement assembly, which we have designated in its entirety by the numeral 219, and over the scale 215. The meter movement assembly is the same as that previously described. Consideration of this figure of the drawings with respect to those described above will show that this pointer projects in the opposite direction from those pointers disclosed hereinabove and that the pointer 217 projects rearwardly and over the moving coil 149. The pointer is bent upwardly as at 221 and from there extends toward the scale in a straight manner. We also provide a counterweight 223 which extends from the moving assembly 219 in a direction opposite to that in which the pointer 217 projects. In this form of our invention as in those previously described we provide a deflection limiting means generally indicated by the numeral 187, and as in the previous forms the deflection limiting means includes a pair of spaced stop lugs 193. The counterweight 223, as will be apparent from the drawings, travels between the stop lugs 193 so that when the counterweight engages either of these lugs the deflection of the pointer 217 will be stopped.

Figure 8:
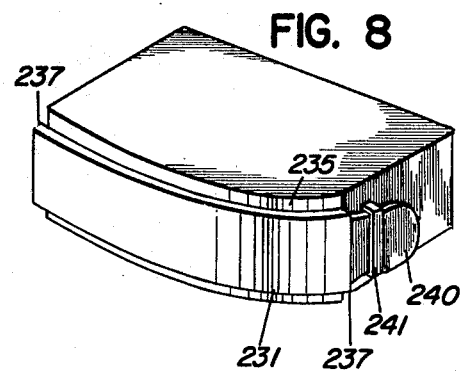
FIG. 8 is a view in perspective illustrating the scale changing means for the meter.
Figure 9:
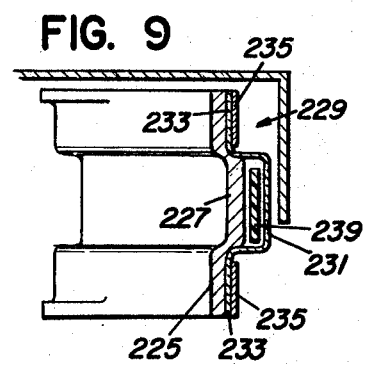
FIG. 9 is a view in section illustrating the scale changing means of FIG. 8 in detail.

In FIGS. 8 and 9 of the drawings we have disclosed a means in association with the types of meters disclosed herein whereby the scale may be changed without opening the instrument housing. It will be obvious that in a great many adaptations of our invention an arrangement whereby the scale may be changed without opening the instrument housing will have many advantages.

In FIG. 9 of the drawings the scale support plate has been given the reference numeral 225 and it includes a central section 227 which extends outwardly with respect to the remainder of the plate support. We provide a transparent plastic housing which we have designated generally by the numeral 229 and which includes a central section 231 which is extended outwardly with respect to its depending peripheral sections 233 which bear against the scale support plate 225 and are retained thereagainst by any suitable means such as bands 235. The transparent shield 231 is slotted at each end as at 237 as especially illustrated in FIG. 8 of the drawings. The scale itself we have designated by the reference numeral 239 and this scale is provided with a tail or hand grip portion 240 on each end thereof which extends through and outwardly with respect to the slots 237. It will now be apparent that when it is desired to change the scale on the instrument either one of the tails 239 is grasped and the scale is pulled outwardly and beyond its plastic housing 231. We may provide, if desired, loops 241 extending outwardly from the case to hold the end tails 239 in proper position against the housing.

We claim:

1. In a miniaturized electrical meter mechanism, in combination, a pair of transversely spaced apart elongated permanent bar type magnets of linear configuration, the poles at each end of said magnets being in the same axial plane, means in supporting engagement with each pole at each end of said magnets, said means providing flux return path structures for each of the magnets, the major portions of said flux return path structures being positioned between said magnets, and one of said flux return path structures including a bridge spaced from the other of said flux return path structures providing an air gap, a moving coil surrounding said bridge, a moving coil supporting element, a pivot assembly and said moving coil supporting element being supported on said pivot assembly, a pointer operatively connected with said pivot assembly for movement therewith over a scale, and the other of said flux return path structures includes a generally elongated central section spaced from said permanent bar type magnets and from said bridge, and said central section, is provided with a shoe extending from each end thereof and one of said shoes extending in one direction from said central section in a plane generally parallel to the longitudinal dimension of said central section and the other of said shoes extending in the other direction from said central section and in a plane generally parallel to the longitudinal dimension of said central section, one of said shoes being in magnetic supporting engagement with a pole of one of said magnets and the other of said shoes being in magnetic supporting engagement with the pole of the other of said magnets, the surface of said central section which is directed toward said bridge being configured to conform to the configuration of said bridge.

2. In a miniaturized electric meter mechanism in accordance with claim 1, wherein said flux return path structure including said bridge includes a member extending from each of the bridge one of said members being in supporting magnetic engagement with a pole of a permanent bar type magnet linearly opposite to the pole thereof with which a shoe is in magnetic engagement, and the other of said members being in magnetic engagement with a pole of the other permanent bar type magnet which is linearly opposite to the pole thereof with which the other of said shoes is in magnetic engagement.

3. In a miniaturized electric meter mechanism, in combination, means providing a magnetic field, flux return path structures operatively related with said means and one of said flux return path structures including a bridge, and members fixed to and extending from each end of said bridge, a moving coil assembly including a winding surrounding said bridge and including a pivot assembly connected with said winding and operable therewith as said winding travels along and about said bridge, and a base element fixed to one of said members and an upper and lower arm spaced apart and fixed to and extending therefrom and supporting said pivot assembly.

4. An electric meter mechanism in combination, comprising means providing a magnetic field, flux return path structures operatively related with said means providing a magnetic field and one of said flux return path structures including a bridge, a moving coil assembly including a winding surrounding said bridge and including a pivot assembly connected with said winding and pivotal therewith as said winding travels along and about said bridge, supporting means comprising a pair of spaced apart upper and lower supporting arms for supporting the pivot bearings of said pivot assembly, said lower supporting arm being formed of electrically conductive material and said pivot assembly including a pair of spaced apart, electrically conductive assembly restoring elements fixed to said pivot assembly for restoring said winding to its deenergized zero central position relative to the bridge, and an electric circuit for connecting the two ends of said winding thereto, said electric circuit including a source of power and a pair of terminals, one of said terminals being electrically connected to a rigid electric conducting means electrically affixed to one of said restoring elements, further rigid electric conducting means connected to said one of said restoring elements and to one end of the winding, further rigid electrically conducting means connected to the other end of the winding and electrically affixed to said other restoring element, and further rigid electric conducting means electrically affixed to said other restoring element and to the lower of said supporting arms, and said lower of said supporting arms being electrically connected to the other said terminal of the electric circuit.

5. In a miniaturized electric meter mechanism, in combination, a housing for the meter mechanism, said housing having a substantially flat upper wall and an arcuate forward end, a transparent shell removably extended over said upper wall, a scale affixed to said upper wall adjacent the arcuate end thereof and between said upper wall and said transparent shell, said meter mechanism including means providing a magnetic field, flux return path structures operatively related with said means and one of said flux return path structures including a bridge, a moving coil assembly including a winding surrounding said bridge and including a pivot assembly, said winding being connected to and etxended from said pivot assembly, and a pointer operatively connected with said pivot assembly and deflectable therewith in accordance with the travel of said winding, and said pointer extending from said pivot assembly over and above the winding and in the same direction from said pivot assembly as said winding projects and being operative over said transparent shell and said scale.

6. In a meter, a housing for enclosing a meter mechanism therein, means for opening and closing said housing and said housing having longitudinal side walls connected at the rear ends thereof by a transverse wall, a forward transverse arcuately shaped wall comprising a support plate, the forward exterior surface of said support plate being exterior of said housing, a flexible scale mounted on the exterior surface of said scale support plate, said longitudinal side walls at their forward ends being provided with a notch therein removably receiving the ends of said scale mounted on the forward exterior surface of said scale support plate, whereby said scale may be removed from the forward exterior surface of said scale support plate while said housing is closed.

7. In a meter, in combination, a housing for enclosing a meter mechanism, said housing having longitudinal side walls connected at the rear ends thereof by a transverse wall, a forward transverse arcuately shaped wall comprising a scale support plate, said longitudinal side walls at their forward ends being provided with a notch therein, and a scale, the major portion of which is of substantially the same width as the width of said scale support plate and said scale being formed of flexible material and being provided with cutouts at each upper corner thereof, providing end sections on the scale of less width than the width of the major portion thereof, said scale being mounted on said scale support plate the said end sections of said scale being removably inserted in the notches formed in the forward ends of the longitudinal side walls.

8. A housing for a meter unit comprising a base, a case slidably, removably mounted on said base, a cover slidably, removably mounted on said case and a shield removably mounted on said base, for full closing of the housing when said base, case, cover and shield are assembled together, co-active means provided on said case and shield for releasably self-locking said shield to the assembly, and said shield having a forward arcuately shaped wall, one surface of said forward arcuately shaped wall being exterior of said housing, a scale removably supported against said exterior surface of said forward arcuately shaped wall whereby said scale may be removed while the housing remains completely closed.

9. In a miniaturized electric meter mechanism, in combination, a pair of spaced apart permanent bar type magnets, means in supporting engagement with each pole of said magnets, and said means providing flux return path structures for each of the magnets, and one of said flux return path structures including a bridge spaced from the other of said flux return path structures providing an air gap, said bridge being of arcuate configuration and positioned between said permanent bar type magnets, a member extending from each end of said bridge and each of said members being in magnetic supporting engagement with a pole of one of said permanent bar type members, the other of said flux return path structures including a generally elongated central section spaced from and between said permanent bar type magnets and from said bridge, a shoe extending outwardly from each end of said central section and in magnetic supporting engagement with a pole of each of said magnets, which is the pole opposite the pole with which a member is in engagement, clamping means connected to and extending between each of said flux return paths and operable to clamp each of said shoes and members against its respective pole of the permanent bar type magnets, a moving coil surrounding said bridge, a moving coil supporting element, a pivot assembly and said moving coil supporting element being supported on said pivot assembly, and a pointer operatively connected with said pivot assembly for moving therewith over a scale.

References Cited

UNITED STATES PATENTS

| | | | |
|---|---|---|---|
| 1,378,983 | 5/1921 | Smith | 324—115 XR |
| 2,550,936 | 5/1951 | Poirette. | |
| 2,833,989 | 5/1958 | Nylander | 324—150 |
| 2,980,857 | 4/1961 | Langford | 324—150 |
| 3,039,055 | 6/1962 | Postal et al. | 324—150 |
| 3,120,639 | 2/1964 | Pfeffer | 324—146 |
| 3,130,365 | 4/1964 | Minter | 324—150 XR |
| 3,144,603 | 8/1964 | Petzinger | 324—150 |
| 3,204,184 | 8/1965 | Roper | 324—150 |
| 3,272,589 | 9/1966 | Huston | 116—129 XR |
| 3,298,351 | 1/1967 | Koza | 73—431 XR |
| 537,501 | 4/1895 | Thompson | 324—150 |
| 863,008 | 8/1907 | Sumpner. | |
| 3,127,561 | 3/1964 | Maislinger | 324—151 |

FOREIGN PATENTS

| | | |
|---|---|---|
| 1,335,834 | 7/1963 | France. |
| 587,675 | 5/1947 | Great Britain. |

GERARD R. STRECKER, Primary Examiner

U.S. Cl. X.R.

324—146, 156